United States Patent
Andersson

(10) Patent No.: US 10,001,300 B2
(45) Date of Patent: Jun. 19, 2018

(54) COAXIAL BOREHOLE HEAT EXCHANGER AND METHOD OF PRODUCING THE SAME

(71) Applicant: TRIOPIPE GEOTHERM AB, Kungsör (SE)

(72) Inventor: Thomas Andersson, Kungsor (SE)

(73) Assignee: TRIOPIPE GEOTHERM AB, Kungsor (SE)

( * ) Notice: Subject to any disclaimer, the term of this patent is extended or adjusted under 35 U.S.C. 154(b) by 201 days.

(21) Appl. No.: 14/650,226

(22) PCT Filed: Dec. 6, 2013

(86) PCT No.: PCT/SE2013/051465
§ 371 (c)(1),
(2) Date: Jun. 5, 2015

(87) PCT Pub. No.: WO2014/088506
PCT Pub. Date: Jun. 12, 2014

(65) Prior Publication Data
US 2015/0316294 A1    Nov. 5, 2015

(30) Foreign Application Priority Data

Dec. 6, 2012    (SE) ...................................... 1251387

(51) Int. Cl.
*F24T 10/17*    (2018.01)
*F24J 3/08*    (2006.01)
(Continued)

(52) U.S. Cl.
CPC ................. *F24J 3/08* (2013.01); *F24J 3/084* (2013.01); *F28D 7/103* (2013.01); *F28D 7/12* (2013.01);
(Continued)

(58) Field of Classification Search
CPC ...... F24J 3/084; F24J 3/08; F24J 3/081; F24J 3/082; F24J 3/083; F28D 7/12;
(Continued)

(56) References Cited

U.S. PATENT DOCUMENTS 540,028 A * 5/1895 Roelker .................... F28D 7/12
165/142
813,918 A    2/1906 Schmitz
(Continued)

FOREIGN PATENT DOCUMENTS

CN    1576768 A    2/2005
CN    202221151 U    5/2012
(Continued)

OTHER PUBLICATIONS

Hengstenberg, DE 3033255, Mar. 18, 1982 (machine translation).*
Maki, JP 58-18087, Feb. 2, 1983 (partial human translation).*

*Primary Examiner* — Hung Q Nguyen
*Assistant Examiner* — Mark L Greene
(74) *Attorney, Agent, or Firm* — Birch, Stewart, Kolasch & Birch, LLP

(57) ABSTRACT

A coaxial borehole heat exchanger includes an innermost pipe and an intermediate pipe arranged coaxially outside the innermost pipe. The intermediate pipe has an inner surface provided with a plurality of axial grooves, and the inner diameter of the intermediate pipe corresponds to the outer diameter of the innermost pipe. The coaxial borehole heat exchanger further includes an outermost pipe arranged coaxially outside the intermediate pipe, wherein the outermost pipe has an inner surface provided with a plurality of axial grooves, and wherein the inner diameter of the outermost pipe corresponds to the outer diameter of the intermediate pipe, wherein the innermost pipe and the plurality of axial grooves of the outermost pipe define liquid flow channels, and wherein the axial grooves of the intermediate
(Continued)

pipe define a thermal insulation layer between the axial grooves of the outermost pipe and the innermost pipe. A method of producing a coaxial borehole heat exchanger is also presented herein.

19 Claims, 4 Drawing Sheets

(51) Int. Cl.
  *F28D 7/12* (2006.01)
  *F28D 7/10* (2006.01)
  *F28D 20/00* (2006.01)
  *F28F 1/00* (2006.01)
  *F28F 1/40* (2006.01)
  *F28F 1/42* (2006.01)

(52) U.S. Cl.
  CPC .......... *F28D 20/0052* (2013.01); *F28F 1/003* (2013.01); *F24J 2003/089* (2013.01); *F28F 1/40* (2013.01); *F28F 1/422* (2013.01); *F28F 2255/16* (2013.01); *F28F 2270/02* (2013.01); *Y02E 10/125* (2013.01); *Y02E 60/142* (2013.01)

(58) Field of Classification Search
  CPC ... F28D 20/0052; Y10E 10/12; Y10E 10/125; F28F 1/40; F03G 7/00; Y02E 10/10
  USPC ............................................ 165/45; 60/641.2
  See application file for complete search history.

(56) References Cited

U.S. PATENT DOCUMENTS

| | | | | |
|---|---|---|---|---|
| 2,665,556 | A * | 1/1954 | Otten | F17C 9/02 165/135 |
| 3,283,811 | A * | 11/1966 | Harvey | F28D 7/12 165/134.1 |
| 3,777,502 | A * | 12/1973 | Michie, III | F16L 9/18 137/340 |
| 4,059,156 | A * | 11/1977 | Berg | E21B 41/02 165/45 |
| 4,228,848 | A * | 10/1980 | Wadkinson, Jr. | F28D 7/106 165/134.1 |
| 4,236,953 | A | 12/1980 | Takahashi | |
| 7,377,122 | B2 * | 5/2008 | Kidwell | F24J 3/084 165/45 |
| 2007/0023163 | A1 * | 2/2007 | Kidwell | F24J 3/084 165/45 |
| 2007/0023164 | A1 * | 2/2007 | Kidwell | F24J 3/084 165/45 |
| 2007/0029066 | A1 * | 2/2007 | Kidwell | F24J 3/084 165/45 |
| 2007/0029067 | A1 * | 2/2007 | Kidwell | F24J 3/084 165/45 |
| 2010/0218912 | A1 * | 9/2010 | Lawless | C09K 8/467 165/45 |

FOREIGN PATENT DOCUMENTS

| | | |
|---|---|---|
| DE | 30 33 255 A1 | 3/1982 |
| DE | 93 08 202 U1 | 7/1993 |
| DE | 10 2009 011 092 A1 | 9/2010 |
| EP | 0 045 993 A1 | 2/1982 |
| EP | 2 136 157 A2 | 9/2010 |
| FR | 2 498 307 A1 | 7/1982 |
| JP | 58018087 A * | 2/1983 ......... F28D 20/0052 |
| JP | 2001-255081 A | 9/2001 |
| WO | WO 2008/009289 A1 | 7/1982 |

* cited by examiner

COAXIAL BOREHOLE HEAT EXCHANGER AND METHOD OF PRODUCING THE SAME

TECHNICAL FIELD

The present disclosure generally relates to borehole heat exchangers and in particular to coaxial borehole heat exchangers.

BACKGROUND

Geothermal heating involves the use of geothermal energy for heating applications. An increasingly popular manner of taking advantage of geothermal energy stored in the ground is by means of borehole heat exchangers (BHE). A BHE comprises one or more pipes installed in a borehole in the ground. A BHE generally has a pipe for heat transfer fluid flow downwards in the borehole and a pipe for heat transfer fluid flow upwards in the borehole. By means of a pump, to which the BHE may be connected, the heat transfer fluid can circulate in the BHE in order to continually absorb heat from the ground or to store heat in the ground.

One type of BHE is a U-pipe installation, which comprises two equal cylindrical pipes connected at the bottom of the borehole, allowing a heat transfer fluid to flow downwards in one of the pipes and upwards in the other in order to exchange heat with the surrounding ground.

Another type of BHE is the coaxial BHE, which has been found to have superior heat transfer efficiency compared to U-pipe installations. Coaxial BHEs are for example disclosed in the paper "First experiences with coaxial borehole heat exchangers" by J. Acuña et al, IIR Conference on Sources/Sinks alternative to the outside Air for HPs and AC techniques, Padua 2011. In section 3 of this paper, a pipe-in-pipe design is disclosed where the coaxial BHE comprises an energy capsule which consists of a thin hose, and a central pipe provided with insulation and arranged in the energy capsule. Water can thereby flow in one direction in the annular space between the energy capsule and in the opposite direction in the central pipe for exchanging heat with the surrounding ground.

However, both the production and installation of such a pipe may be unnecessarily complicated, and the robustness of this design may be lower than what would be ideal. In view of the above, there is a desire to improve existing coaxial BHEs.

SUMMARY

In view of the above, a general object of the present disclosure is to provide a coaxial borehole heat exchanger and a production method thereof which solve or at least mitigate the problems of the prior art.

Hence, according to a first aspect of the present discloser there is provided a coaxial borehole heat exchanger comprising: an innermost pipe; an intermediate pipe arranged coaxially outside the innermost pipe, wherein the intermediate pipe has an inner surface provided with a plurality of axial grooves, and wherein the inner diameter of the intermediate pipe corresponds to the outer diameter of the innermost pipe; and an outermost pipe arranged coaxially outside the intermediate pipe, wherein the outermost pipe has an inner surface provided with a plurality of axial grooves, and wherein the inner diameter of the outermost pipe corresponds to the outer diameter of the intermediate pipe; wherein the innermost pipe and the plurality of axial grooves of the outermost pipe define liquid flow channels, and wherein the axial grooves of the intermediate pipe define a thermal insulation layer between the axial grooves of the outermost pipe and the innermost pipe.

Effects which may be obtainable hereby is a fixed geometry coaxial borehole heat exchanger which is simpler to manufacture, simpler to install and more robust than the prior art. In particular, robust and long lifetime thermal insulation between the opposite direction liquid flow channels can be provided by means of the thermal insulation layer provided by the axial grooves of the intermediate pipe. In contrast, prior art typically utilised thermal foam insulators or similar structural insulators, which when long-term subjected to high water pressures of 10-20 bar at 100 to 200 meters depth could implode or otherwise be ruined and thus become inefficient.

According to one embodiment the axial grooves of the intermediate pipe are evenly distributed in the circumferential direction along the inner surface of the intermediate pipe. Thereby, constant mechanical withstand strength of the outermost pipe can be provided.

According to one embodiment the axial grooves of the outermost pipe are evenly distributed in the circumferential direction along the inner surface of the outermost pipe. Thereby, constant thermal insulation of the outermost pipe can be provided in the circumferential direction, i.e. the angular direction in a cylindrical coordinate system.

According to one embodiment the axial grooves of the intermediate pipe extend along the majority of entire length of the intermediate pipe.

According to one embodiment the axial grooves of the outermost pipe extend along the majority of the length of the outermost pipe.

One embodiment comprises a return cup for arrangement at one end face of the innermost pipe, the intermediate pipe and the outermost pipe, wherein the return cup has a liquid return chamber having a floor and at least one distancing member that is elevated from the floor, which at least one distancing member is arranged to abut against the end face such that liquid is able to flow between the liquid flow channels of the outermost pipe and the liquid flow channel of the innermost pipe, and wherein the thermal insulation layer is open-ended at the one end face and extends into the return cup.

According to one embodiment the at least one distancing member has a first transverse extension and a second transverse extension relative the longitudinal extension of the borehole heat exchanger, wherein the first transverse extension is at most equal to the dimension of the outer diameter of the intermediate pipe and wherein the second transverse extension is less than the dimension of the inner diameter of the innermost pipe.

According to one embodiment the innermost pipe, the intermediate pipe and the outermost pipe are made of plastic.

According to one embodiment the outermost pipe comprises a thermally conductive compound.

According to one embodiment the thermally conductive compound has a higher thermal conductivity than that of the innermost pipe and the intermediate pipe.

One embodiment comprises a valve provided at an outer surface of the borehole heat exchanger in level with an end portion of an axial groove of the intermediate pipe, wherein the valve is arranged in fluid communication with the end portion of the axial groove of the intermediate pipe.

One embodiment comprises a fluid conduit arranged along another axial groove of the intermediate pipe, wherein the fluid conduit extends from one end of the coaxial borehole heat exchanger along the majority of the longitudinal extension of the borehole heat exchanger.

According to a second aspect of the present disclosure there is provided a method of producing a coaxial borehole heat exchanger according to the first aspect, wherein the method comprises:

a) extruding the innermost pipe, the intermediate pipe and the outermost pipe.

According to one embodiment the step a) of extruding comprises co-extruding the innermost pipe, the intermediate pipe and the outermost pipe.

One embodiment comprises b) inserting the innermost pipe into the intermediate pipe and inserting the intermediate pipe into the outermost pipe.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
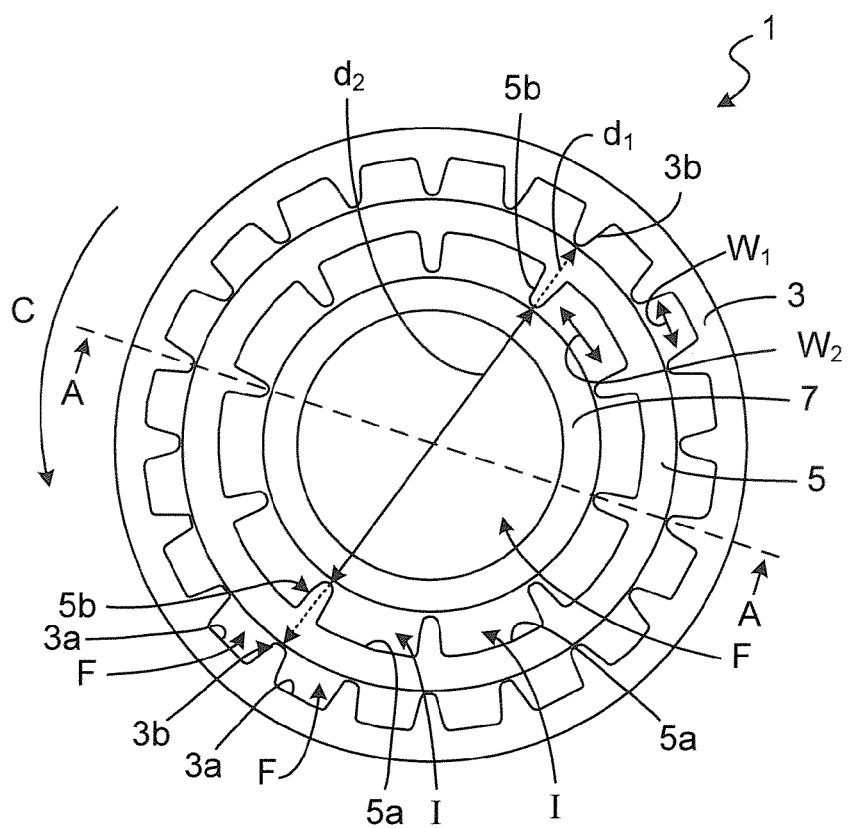
FIG. 1 is a schematic cross-sectional view of a coaxial borehole heat exchanger according to the present disclosure.

FIG. 1 shows a cross section of one example of a coaxial borehole heat exchanger 1 arranged to be installed in a borehole in the ground such that heat can be transferred between ground and a heat transfer liquid, e.g. water, flowing in the coaxial borehole heat exchanger 1.

Coaxial borehole heat exchanger 1 comprises an outermost pipe 3, an intermediate pipe 5 and an innermost pipe 7. The outermost pipe 3, the intermediate pipe 5 and the innermost pipe 7 are arranged coaxially. In particular, the intermediate pipe 5 is arranged between the outermost pipe 3 and the innermost pipe 7 along the majority of their longitudinal length.

The outermost pipe 3 has an inner surface provided with a plurality of axial grooves 3a. Thus, between each pair of adjacent axial groove 3a an axial rib 3b is defined. The distance between the tips of two opposite ribs 3b of the outermost pipe 3 defines the inner diameter d1 of the outermost pipe 3. Thus, all the axial rib 3b are essentially of the same height, i.e. they protrude essentially the same distance inwards in the coaxial borehole heat exchanger 1.

The axial grooves 3a of the outermost pipe 3 are evenly distributed in the circumferential direction C along the inner surface of the outermost pipe 3. According to one embodiment, there are a plurality of axial ribs 3b, and a plurality of axial grooves 3a for each quarter turn along each cross section of the outermost pipe 3. Thus, any quarter turn, i.e. any 90° section of a cross section of the outermost pipe 3 comprises a plurality of axial ribs 3b and a plurality of axial grooves 3a. In other words, in the case of a circular outermost pipe, each quadrant comprises a plurality of ribs 3b and a plurality of grooves 3a. However, variations of the borehole heat exchanger where the axial grooves of the outermost pipe are distributed in a different manner are also envisaged.

According to one variation of the coaxial borehole heat exchanger 1, the axial grooves 3a of the outermost pipe 3 may extend along the majority of the length of the coaxial borehole heat exchanger 1. Hereto, the axial grooves preferably extend from one end of the coaxial borehole heat exchanger covering the majority of its length. The coaxial borehole heat exchanger is beneficially installed in a borehole with that end facing the bottom of the borehole which has axial grooves.

The intermediate pipe 5 has an inner surface provided with a plurality of axial grooves 5a. Thus, between each pair of adjacent axial groove 5a an axial rib 5b is defined. The distance between the tips of two opposite ribs 5b of the intermediate pipe 5 defines the inner diameter d2 of the outermost pipe 3. Thus, the axial ribs 5b are essentially of the same height, i.e. they protrude essentially the same distance inwards in the coaxial borehole heat exchanger 1.

The axial grooves 5a of the intermediate pipe 5 are distributed evenly in the circumferential direction C along the inner surface of the intermediate pipe 5. According to one embodiment, there are a plurality of axial ribs 5b, and a plurality of axial grooves 5a for each quarter turn along each cross section of the intermediate pipe 5. Thus, any quarter turn, i.e. any 90° section of a cross section of the intermediate pipe 5 comprises a plurality of axial ribs 5b and a plurality of axial grooves 5a. In other words, in the case of a circular intermediate pipe, each quadrant comprises a plurality of ribs 5b and a plurality of grooves 5a. However, variations of the borehole heat exchanger where the axial grooves of the intermediate pipe are distributed in a different manner are also envisaged.

According to one variation of the coaxial borehole heat exchanger 1, the axial grooves 5a of the intermediate pipe 5 may extend along the majority of the length of the coaxial borehole heat exchanger 1. Hereto, the axial grooves preferably extend from one end of the coaxial borehole heat exchanger covering the majority of its length. The axial grooves 5a of the intermediate pipe 5 are preferably arranged along the same section of the coaxial borehole heat exchanger as the axial grooves 3a of the outermost pipe 3.

The plurality of axial grooves 3a of the outermost pipe 3 define liquid flow channels for a heat transfer liquid. Also the innermost pipe 7 defines a liquid flow channel F for a heat transfer liquid. The plurality of axial grooves 5a of the intermediate pipe 5 define a thermal insulation layer between the axial grooves 3a of the outermost pipe 3 and the innermost pipe 7. The thermal insulation layer is defined by a plurality of insulation channels I formed by the axial grooves 5a of the intermediate pipe 5. The thermal insulation layer can for example be obtained by the provision of a gas, such as air, into the insulation channels I.

The inner diameter d1 of the outermost pipe 3 corresponds to the outer diameter of the intermediate pipe 5. This is to be understood to mean that the inner diameter d1 of the outermost pipe 3 is essentially equal to the outer diameter of the intermediate pipe 5. Thereby, the intermediate pipe 5 is fixedly arranged in the outermost pipe 3.

The inner diameter d2 of the intermediate pipe 5 corresponds to the outer diameter of the innermost pipe 7. This is to be understood to mean that the inner diameter d2 of the intermediate pipe 5 is essentially equal to the outer diameter of the innermost pipe 7. Thereby, the innermost pipe 7 is fixedly arranged in the intermediate pipe 5. Consequently, this fixed geometry design provides a robust coaxial borehole heat exchanger. This may be beneficial during production, installation and use of the coaxial borehole heat exchanger 1, as will be elaborated further herein.

According to one variation of the coaxial borehole heat exchanger 1, each axial groove 3a of the plurality of axial grooves of the outermost pipe 3 has a width w1, and each axial groove 5a of the plurality of axial grooves of the intermediate pipe 5 has a width w2. The width w2 of an axial groove 5a of the intermediate pipe 5 is greater than the width w1 of an axial groove 3a of the outermost pipe 3. The pressure which the outermost pipe 3 is subjected to by the heat transfer liquid is very high at 100 to 200 meters depth, which are typical installation depths for coaxial borehole heat exchangers. At this depth the liquid pressure is in the range of 10-20 bar. Therefore the liquid flow channels F of the outermost pipe 3 have the highest requirements of mechanical withstand strength. By a suitably dense distribution of axial grooves 3a in the outermost pipe 3, i.e. axial grooves with a relatively small width w1, the necessary mechanical withstand strength of the outermost pipe 3 may be obtained. Moreover, since the mechanical withstand strength requirement is lower for the intermediate pipe 5, the width w2 of the axial grooves 5a of the intermediate pipe 5 may be greater than the width w1 of the axial grooves 3a of the outermost pipe 3. Hence, the intermediate pipe 5 has fewer insulation channels I than the outermost pipe 5 has liquid flow channels F. This is advantageous in that more insulation gas can be provided in the thermal insulation layer, thereby rendering the thermal insulation more efficient.

It is envisaged that in one variation of the coaxial borehole heat exchanger the axial grooves of the intermediate pipe may have widths that differ between them, i.e. they may have varying width. Moreover, the axial grooves of the outermost pipe can according to one variation have varying width.

According to one variation of the coaxial borehole heat exchanger 1, some of the axial ribs 3b of the outermost pipe 3 are aligned with corresponding axial ribs 5b of the intermediate pipe 5. Thus, there exist pairs of axial ribs 3b, 5b of the outermost pipe 5 and the intermediate pipe 5 which are radially aligned. This may further strengthen the mechanical withstand strength of the coaxial borehole heat exchanger 1.

According to one variation of the borehole heat exchanger 1, a cross section of the outer periphery of each of the innermost pipe 7, the intermediate pipe 5 and the outermost pipe 3 is circular. Other cross-sectional shapes of the outer periphery of the innermost pipe, the intermediate pipe and the outermost pipe are however also envisaged.

The innermost pipe 7, the intermediate pipe 5 and the outermost pipe 3 can for example be made of plastic, such as polyethylene. According to one variation hereof, the outermost pipe may comprise a thermally conductive compound that has a higher thermal conductivity than that of the innermost pipe and the intermediate pipe. Such a compound may for example contain thermally conductive metallic fillers, e.g. copper, aluminium or nitrides such as boron nitride and aluminium nitride, or carbon-based materials. An example of a suitable carbon-based material is expanded graphite.

Figure 2:
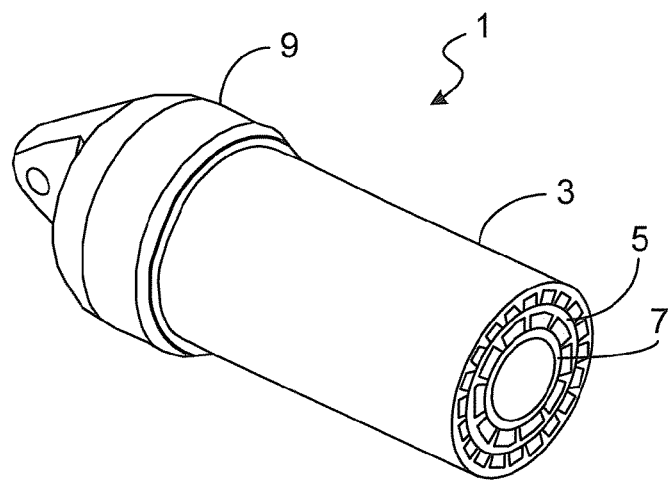
FIG. 2 is a perspective view of a cross section of an end portion of the coaxial borehole heat exchanger in FIG. 1.

FIG. 2 is a perspective view of a cross section of an end portion of the coaxial borehole heat exchanger 1. In this figure, the coaxial borehole heat exchanger 1 further comprises a return cup 9. The return cup 9 can be arranged at one end of the coaxial borehole heat exchanger 1. Typically this end of the coaxial borehole heat exchanger 1 is arranged at the bottom of the borehole when installed. The return cup 9 enables circulation of the heat transfer liquid in the coaxial borehole heat exchanger 1. In particular it provides means for changing the flow direction of the heat transfer liquid, e.g. from flowing downwards to flowing upwards in the coaxial borehole heat exchanger. Generally, the flow direction in the liquid flow channels F defined by the axial grooves 3a of the outermost pipe 3 and the liquid flow channel F defined by the innermost pipe 7 depend on the specific application of the coaxial borehole heat exchanger 1. For example, if heat is to be stored in the ground, the liquid beneficially flows downwards in the liquid flow channels F defined by the axial grooves 3a of the outermost pipe 3 such that heat from the liquid may be transferred to the ground. The liquid then flows upwards through the innermost pipe 7. When heat is to be absorbed from the ground, the flow directions are opposite compared to when storing heat, i.e. liquid flows downwards is in the innermost pipe 7 and flows upwards through the liquid flow channels F defined by the axial grooves 3a of the outermost pipe 3. The return cup 9 will be described in more detail with reference to FIG. 3 and FIGS. 4a-b.

Figure 3:
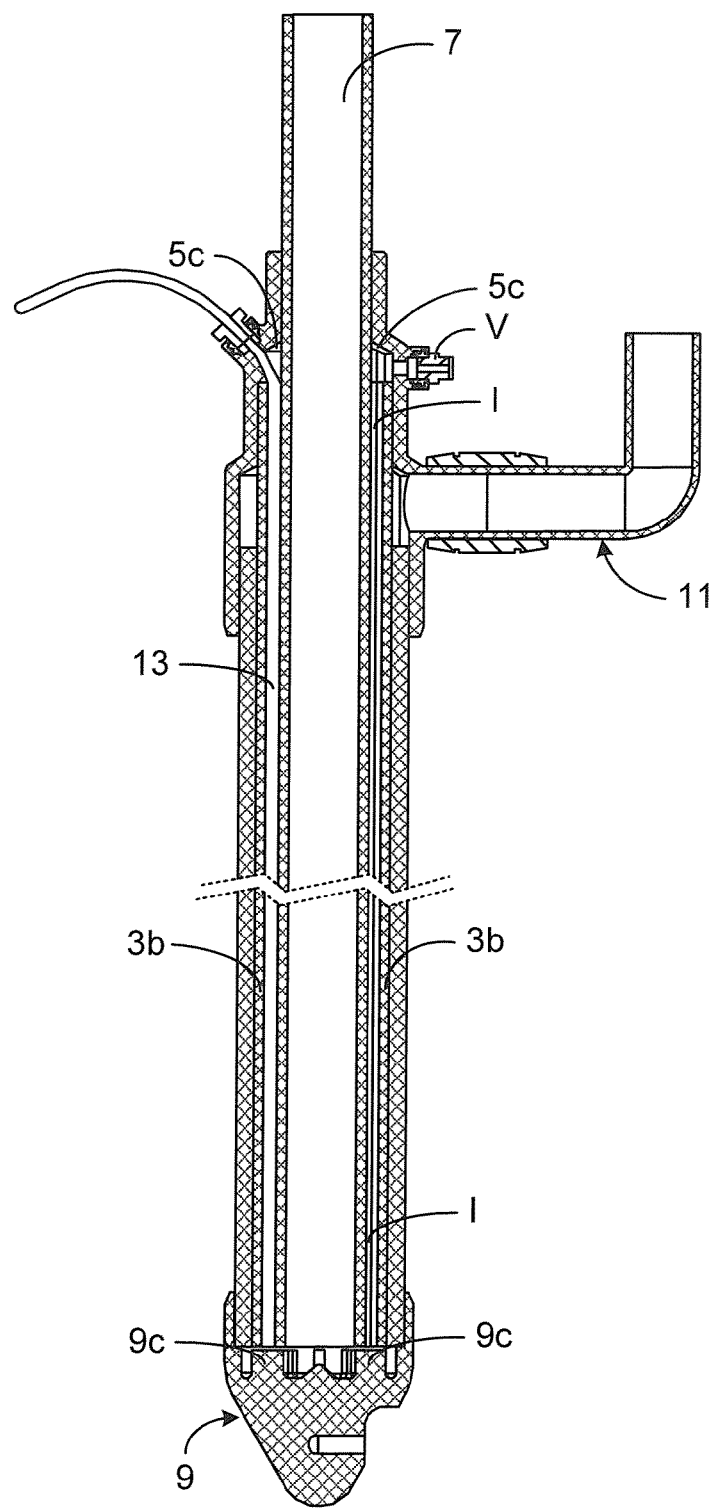
FIG. 3 is a longitudinal section of a coaxial borehole heat exchanger.

FIG. 3 shows a longitudinal section A-A of the coaxial borehole exchanger 1 in FIG. 1 along the entire length thereof. The coaxial borehole heat exchanger 1 is in FIG. 3 is oriented as when installed in a borehole. The coaxial borehole heat exchanger 1 can be connected to an inlet/outlet pipe 11, which depending on whether heat storage or heat retrieval is desired, provides heat transfer liquid to, or receives heat transfer liquid from, the coaxial borehole heat exchanger 1, and in particular to/from the liquid flow channels F of the outermost pipe 3. The inlet/outlet pipe 11, which is arranged above ground when the coaxial borehole heat exchanger 1 has been installed, is arranged to be connected to a heat pump, not shown in the drawing. The innermost pipe 7 is also arranged to be connected to the heat pump such that heat transfer liquid may circulate through the coaxial borehole heat exchanger 1 whereby geothermal heating may be obtained.

According to one variation the coaxial borehole heat exchanger 1 comprises a valve V which is provided at an outer surface of the borehole heat exchanger 1, for example on the outer surface of the outermost pipe 3. The valve V is arranged in level with an end portion of an axial groove of the intermediate pipe 5. The valve V is arranged in fluid communication with the axial groove 5a of the intermediate pipe 5 at the end portion thereof. Hereto, at this end portion, the axial groove 5a, with which the valve V is in fluid communication is terminated, i.e. the cavity or channel formed by the axial grooves 5a of the intermediate pipe 5 ends here. Thus, any fluid provided through the valve V to the axial groove 5a is in the end forced to flow in one direction, viz. downwardly when the coaxial borehole heat exchanger 1 has been installed. The valve V is in fluid communication with the axial groove 5a via a gas entry conduit extending in the radial direction through the outer surface of the coaxial borehole heat exchanger 1 to the axial groove 5a. The valve V may be connected to a pressure vessel in order to provide high pressure gas to the insulation channels I. The purpose and operation of the valve V will be described in the following.

The coaxial borehole heat exchanger 1 may further comprise a fluid conduit 13. The fluid conduit 13 is provided in an axial groove 5a, preferably a different axial groove 5a than the one which is in fluid communication with the valve V, of the intermediate pipe 5, and extending along this axial groove 5a from one end of the coaxial borehole heat exchanger along the majority of the longitudinal extension thereof. The fluid conduit 13 is preferably arranged such that one end thereof is below ground, essentially extending to the end face of the coaxial borehole heat exchanger to the return cup 9, while the other end thereof is above ground when the coaxial borehole heat exchanger has been installed. The fluid conduit 13 exits the insulation channel I and thus the axial groove 5a via a through opening extending from the axial groove 5a to the outer surface of the coaxial borehole heat exchanger 1. The fluid conduit 13 may be provided with a valve 15 arranged for example at its exit point from the coaxial borehole heat exchanger 1. According to one variation, the fluid conduit 13 exits the axial groove 5a essentially in level with or in level with the valve V through which gas can be provided to the insulation channels I.

The above-described design substantially facilitates the installation of the coaxial borehole heat exchanger 1. All three coaxial pipes, i.e. the innermost pipe 7, the intermediate pipe 5 and the outermost pipe 3 may when coaxially fully assembled be lowered into a borehole. Due to the depth at which the coaxial heat exchanger is to be installed, the borehole normally contains ground water. Thus, the liquid flow channels F defined by the axial grooves 3a of the outermost pipe 3, the insulation channels I, i.e. the axial grooves 5a of the intermediate pipe 5, and the liquid flow channel F of the innermost pipe 7 will be filled with water when lowered into the borehole. This is generally not a problem for the liquid flow channels F, as liquid will be circulating in these. However, it is not desirable to have the thermal insulation layer I filled with water, as the insulation properties of water are worse than that of a gas such as air. Hereto, a high pressure gas may be provided into the thermal insulation layer I from a pressure vessel via the valve V. The gas hence flows at high pressure downwardly in the insulation channels I, pushing any ground water downwards and eventually upwards through the fluid conduit 13. Any water contained in the thermal insulation layer, i.e. in any axial groove 5a, may thereby be flushed out through the fluid conduit 13.

The thermal insulation layer I may, if so desired, be pressurised at high constant pressure by means of gas, e.g. by providing high pressure gas to the thermal insulation layer and then closing the valve V. If the coaxial borehole heat 1 exchanger is provided with a sensor, such as a manometer, arranged to sense the pressure in the thermal insulation layer, a pressure change in the thermal insulation layer I can be detected. A change in pressure may indicate that water has accumulated in the thermal insulation layer. If this occurs, high pressure gas may by means of a pressure vessel via the valve V be provided to remove the accumulated water from the thermal insulation layer. Thereby constant monitoring and control of the insulation capacity of the thermal insulation layer can be achieved. Moreover, by having pressurised gas in the thermal insulation layer, pressure compensation of the pressure applied by the heat transfer liquid in the liquid flow channels F of the outermost pipe 3 to the intermediate pipe 5 can be obtained in the sense that the pressure level in the thermal insulation layer offsets a corresponding pressure from the liquid flow channels F of the outermost pipe 3. If for example after installation of the coaxial borehole heat exchanger in a borehole, the gas, e.g. air, in the thermal insulation layer is pressurised to 5 bar, then at 50 meters depth a pressure balance will be obtained as this pressure counteracts the pressure from the liquid pressure in the liquid flow channels of the outermost pipe. Moreover, the pressure difference between the thermal insulation layer and the liquid flow channels F of the outermost pipe 3 will at 100 meters depth only be half of what it would have been if the gas would not have been pressurised. Thereby the risk of implosion of the outermost pipe/intermediate pipe due to high liquid pressure difference can be reduced.

It is envisaged that instead of filling the thermal insulation layer with a gas, a liquid thermal insulation medium may be provided in the thermal insulation layer. Furthermore, this liquid thermal insulation medium could according to one variation be of a type that becomes solidified in the thermal insulation layer after having been provided into the insulation channels of the intermediate pipe, when the coaxial borehole heat exchanger has been installed in a borehole and when the above-described water removal procedure from the insulation channels has been performed. An example of such a thermal insulation medium could be expanding polyurethane foam of Divinycell type.

Figure 4A:
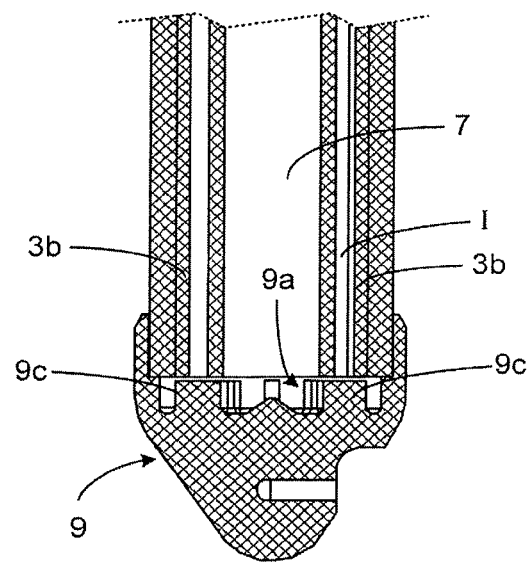
FIG. 4a is a longitudinal section of an end portion of the coaxial borehole heat exchanger in FIG. 3.

FIGS. 4a and b show schematic views of the return cup 9. The return cup 9 has a liquid return chamber 9a having a floor 9b. The return cup 9 further has at least one distancing member 9c elevated from the floor 9b. The at least one distancing member 9b is arranged to abut against the end face of the coaxial borehole heat exchanger 1 when assembled therewith such that liquid is able to flow between the liquid flow channels F of the outermost pipe 3 and the liquid flow channel F of the innermost pipe 7. Thus, the at least one distancing member 9c distances the end face of the coaxial borehole heat exchanger 1 from the floor 9b and allows liquid to flow into the liquid return chamber 9a from the coaxial borehole heat exchanger 1, to flow past the at least one distancing member 9c and back into the coaxial borehole heat exchanger 1.

Figure 4B:
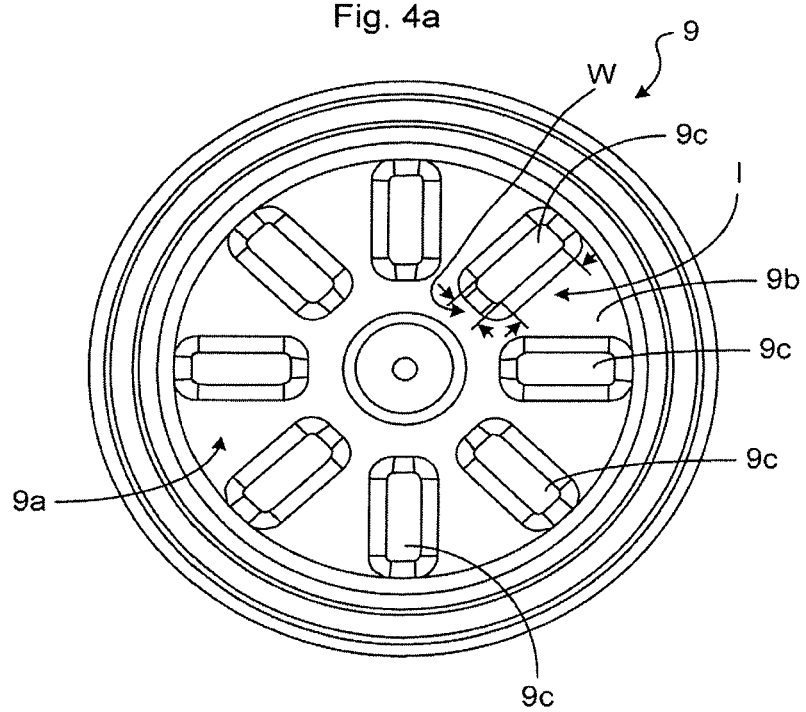
FIG. 4b is an elevated view of a return cup.

The distancing member 9c has a first transverse extension 1 and a second transverse extension w relative the longitudinal extension of the coaxial borehole heat exchanger 1 when the return cup 9 is assembled with the coaxial borehole heat exchanger 1. The first transverse extension 1 and a second transverse extension w hence extend in a plane parallel to the floor 9b. The first transverse extension 1 is at most equal to the dimension of the outer diameter of the intermediate pipe 5 and the second transverse extension w is less than the dimension of the inner diameter of the innermost pipe 7. FIG. 4b shows an example of a return cup 9 comprising a plurality of distancing members 9c distributed on the floor 9b of the liquid return chamber 9a.

Figure 5:
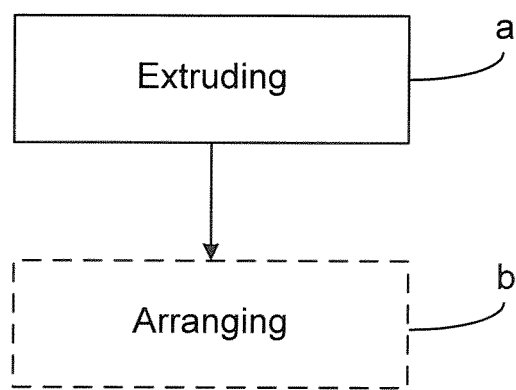
FIG. 5 is a flowchart of a method of producing a coaxial borehole heat exchanger.

FIG. 5 is a flowchart of a method of producing the coaxial borehole heat exchanger 1. The design of concentrically arranged pipes allows for a simple production process, especially if the coaxial borehole heat exchanger is made of plastic. In particular, the coaxial borehole heat exchanger 1 may be manufactured by an extrusion process.

Raw plastic is in a first step provided to an extrusion machine. In a step a) the innermost pipe 7, the intermediate pipe 5 and the outermost pipe 3 are extruded by the extrusion machine. The extrusion of the pipes 3, 5, and 7 may either be made one by one, or they may be co-extruded.

In case the pipes 3, 5, and 7 are extruded one by one in step a), a step b) of arranging the innermost pipe 7, the intermediate pipe 5 and the outermost pipe 3 coaxially is carried out. This may for example be performed by inserting the innermost pipe 7 into the intermediate pipe 5 and inserting the intermediate pipe 5 into the outermost pipe 3. The insertions can be done in any suitable order.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A coaxial borehole heat exchanger comprising:
an innermost pipe;
an intermediate pipe arranged coaxially outside the innermost pipe, wherein the intermediate pipe has an inner surface provided with a plurality of ribs extending radially inwardly and a plurality of axial grooves formed between the plurality of ribs, and wherein an inner diameter of the intermediate pipe corresponds to an outer diameter of the innermost pipe;
an outermost pipe arranged coaxially outside the intermediate pipe, wherein the outermost pipe has an inner surface provided with a plurality of ribs extending radially inwardly and a plurality of axial grooves formed between the plurality of ribs, and wherein an inner diameter of the outermost pipe corresponds to an outer diameter of the intermediate pipe;
a valve provided at an outer surface of the coaxial borehole heat exchanger in level with an end portion of one of the plurality of axial grooves of the intermediate pipe, wherein the valve is arranged in fluid communication with the end portion of the one of the plurality of axial grooves of the intermediate pipe,
wherein the innermost pipe and the plurality of axial grooves of the outermost pipe define liquid flow channels, wherein the plurality of axial grooves of the intermediate pipe define a thermal insulation layer between the plurality of axial grooves of the outermost pipe and the innermost pipe, and
wherein the innermost pipe, the intermediate pipe and the outermost pipe are separate from one another and are made of plastic, and
a return cup arranged at one end face of the innermost pipe, the intermediate pipe and the outermost pipe, the innermost pipe, the intermediate pipe and the outermost pipe extending coaxially all the way into the return cup, wherein the return cup has a liquid return chamber having a floor and at least one distancing member extending from the floor, wherein the at least one distancing member abuts against the one end face such that liquid is able to flow between the liquid flow channels of the outermost pipe and the liquid flow channel of the innermost pipe in the return cup, and
wherein the thermal insulation layer is open-ended at the one end face and extends into the return cup.

2. The coaxial borehole heat exchanger as claimed in claim 1, wherein the plurality of axial grooves of the intermediate pipe are evenly distributed in a circumferential direction along the inner surface of the intermediate pipe.

3. The coaxial borehole heat exchanger as claimed in claim 2, wherein the plurality of axial grooves of the outermost pipe are evenly distributed in the circumferential direction along the inner surface of the outermost pipe.

4. The coaxial borehole heat exchanger as claimed in claim 2, wherein the plurality of axial grooves of the intermediate pipe extend along a majority of a length of the intermediate pipe.

5. The coaxial borehole heat exchanger as claimed in claim 2, wherein the plurality of axial grooves of the outermost pipe extend along a majority of a length of the outermost pipe.

6. The coaxial borehole heat exchanger as claimed in claim 1, wherein the plurality of axial grooves of the outermost pipe are evenly distributed in a circumferential direction along the inner surface of the outermost pipe.

7. The coaxial borehole heat exchanger as claimed in claim 6, wherein the plurality of axial grooves of the intermediate pipe extend along a majority of a length of the intermediate pipe.

8. The coaxial borehole heat exchanger as claimed in claim 6, wherein the plurality of axial grooves of the outermost pipe extend along a majority of a length of the outermost pipe.

9. The coaxial borehole heat exchanger as claimed in claim 1, wherein the plurality of axial grooves of the intermediate pipe extend along a majority of a length of the intermediate pipe.

10. The coaxial borehole heat exchanger as claimed in claim 1, wherein the plurality of axial grooves of the outermost pipe extend along a majority of a length of the outermost pipe.

11. The coaxial borehole heat exchanger as claimed in claim 1, wherein the at least one distancing member has a first transverse dimension and a second transverse dimension relative a longitudinal extension of the coaxial borehole heat exchanger, wherein the first transverse dimension is at most equal to the outer diameter of the intermediate pipe and wherein the second transverse dimension is less than an inner diameter of the innermost pipe.

12. The coaxial borehole heat exchanger as claimed in claim 1, wherein the outermost pipe comprises a thermally conductive compound.

13. The coaxial borehole heat exchanger as claimed in claim 12, wherein the thermally conductive compound has a higher thermal conductivity than a thermal conductivity of the innermost pipe and the intermediate pipe.

14. The coaxial borehole heat exchanger as claimed in claim 1, further comprising a fluid conduit arranged along another axial groove of the intermediate pipe, wherein the fluid conduit extends from one end of the coaxial borehole heat exchanger along a majority of a longitudinal extension of the coaxial borehole heat exchanger.

15. A method of producing the coaxial borehole heat exchanger according to claim 1, said method comprising the step of:
extruding the innermost pipe, the intermediate pipe and the outermost pipe.

16. The method as claimed in claim 15, further comprising the step of arranging the innermost pipe, the intermediate pipe and the outermost pipe coaxially.

17. The coaxial borehole heat exchanger as claimed in claim 1, wherein the width of the plurality of axial grooves of the intermediate pipe is greater than the width of the plurality of axial grooves of the outermost pipe.

18. The coaxial borehole heat exchanger as claimed in claim 1, wherein the plurality of axial grooves of the intermediate pipe have varying widths.

19. The coaxial borehole heat exchanger as claimed in claim 1, wherein the valve is connected to a pressure vessel and is configured to provide high pressure gas to the thermal insulation layer of the intermediate pipe.

* * * * *